(12) United States Patent
Blöchlinger

(10) Patent No.: US 10,753,491 B2
(45) Date of Patent: Aug. 25, 2020

(54) CHECK VALVE

(71) Applicant: BLOECHLINGER ENGINEERING AG, Aarau (CH)

(72) Inventor: Michael Blöchlinger, Aarau (CH)

(73) Assignee: BLOECHLINGER ENGINEERING AG, Aarau (CH)

( * ) Notice: Subject to any disclaimer, the term of this patent is extended or adjusted under 35 U.S.C. 154(b) by 196 days.

(21) Appl. No.: 15/761,592

(22) PCT Filed: Sep. 20, 2016

(86) PCT No.: PCT/EP2016/072335
§ 371 (c)(1),
(2) Date: Mar. 20, 2018

(87) PCT Pub. No.: WO2017/050783
PCT Pub. Date: Mar. 30, 2017

(65) Prior Publication Data
US 2018/0347716 A1  Dec. 6, 2018

(30) Foreign Application Priority Data

Sep. 25, 2015  (CH) ........................................ 1392/15

(51) Int. Cl.
*F16K 15/04* (2006.01)
*F16K 27/02* (2006.01)

(52) U.S. Cl.
CPC .......... *F16K 15/044* (2013.01); *F16K 15/048* (2013.01); *F16K 27/0209* (2013.01); *Y10T 137/7929* (2015.04)

(58) Field of Classification Search
CPC .. F16K 15/044; F16K 15/048; F16K 27/0209; Y10T 137/7927; Y10T 137/7928; Y10T 137/7929; Y10T 137/7937
See application file for complete search history.

(56) References Cited

U.S. PATENT DOCUMENTS 2,929,399 A * 3/1960 Magowan, Jr. ....... F16K 15/044
137/513.7
3,058,486 A * 10/1962 McDermott .......... F16K 15/026
137/515.5
(Continued)

FOREIGN PATENT DOCUMENTS

DE         19622123 A1    12/1997
DE     102006007583 A1     8/2007
(Continued)

OTHER PUBLICATIONS

International Preliminary Report on Patentability dated Mar. 27, 2018 for International Application No. PCT/EP2016/072335 (8 pages—in German with English translation).
(Continued)

*Primary Examiner* — Marina A Tietjen
*Assistant Examiner* — Frederick D Soski
(74) *Attorney, Agent, or Firm* — Smith, Gambrell & Russell, LLP

(57) ABSTRACT

A check valve (10) for reception in a fluid passage (5) comprises a valve seat element (1), a valve body (2), and a sleeve (3) wherein the valve body (2) is moveable in such a manner in the sleeve (3), that it rests in a first position on the valve seat element (1) and it is arranged a distance with respect to the valve seat element (1) in a second position. The valve seat element (1) contains an opening (11) which can be closed by the valve body (2) in the first position. A spring element (4) is arranged between the valve body (2) and the sleeve (3). The spring element comprises a first end (41) and a second end (42), wherein the valve body (2) is retained by the spring element (4) in the first position as long as the fluid pressure present in the opening (11) is smaller than the closing force of the spring element,(4), wherein the first end (41) of the spring element (4) is connected to the valve body (2). The sleeve (3) comprises a first jacket
(Continued)

element (31) which is configured to be retained in the passage (5). The sleeve (3) comprises a second jacket element (32) which is configured to retain the second end (42) of the spring element (4). The spring element (4) is retained in an opening (33) of the second jacket element (32).

20 Claims, 7 Drawing Sheets

(56) References Cited

U.S. PATENT DOCUMENTS

| | | | | |
|---|---|---|---|---|
| 3,421,547 A * | 1/1969 | Aslan | ............... | F16K 15/044 137/539 |
| 3,845,785 A * | 11/1974 | McMath | ............... | F16K 15/044 137/517 |
| 4,004,533 A * | 1/1977 | Woolston | ............... | B63G 8/22 114/333 |
| 4,091,839 A * | 5/1978 | Donner | ............... | F16K 15/044 137/533.13 |
| 4,105,044 A * | 8/1978 | Davitt | ............... | F16K 15/026 137/517 |
| 4,287,912 A * | 9/1981 | Hewett | ............... | F16K 15/044 137/516.27 |
| 4,365,648 A * | 12/1982 | Grothe | ............... | F16K 15/044 137/539 |
| 4,700,741 A * | 10/1987 | Murphy | ............... | F16K 15/044 137/539 |
| 4,706,705 A * | 11/1987 | Lee, II | ............... | F16K 15/044 137/454.2 |
| 4,893,650 A * | 1/1990 | Chisholm | ............... | F16K 15/044 137/539 |
| 5,065,790 A * | 11/1991 | Kornas | ............... | B60T 13/52 137/514.5 |
| 5,353,834 A * | 10/1994 | Schmitt | ............... | B60T 8/341 137/539.5 |
| 5,937,896 A * | 8/1999 | Miyajima | ............... | F16K 15/044 137/533.11 |
| 6,042,350 A * | 3/2000 | Beck | ............... | B60T 8/4031 137/543.19 |
| 6,217,300 B1 * | 4/2001 | Schuller | ............... | B60T 8/4031 417/454 |
| 6,241,491 B1 * | 6/2001 | Kuther | ............... | F04B 53/1002 417/553 |
| 6,250,336 B1 * | 6/2001 | Murphey | ............... | B60R 15/00 137/539 |
| 6,550,698 B2 * | 4/2003 | Ness | ............... | F01P 3/08 239/132 |
| 6,622,751 B1 * | 9/2003 | Beck | ............... | B60T 8/4031 137/315.33 |
| 6,866,489 B2 * | 3/2005 | Hinz | ............... | B60T 8/4031 137/454.4 |
| 7,296,594 B1 * | 11/2007 | Phanco | ............... | F16H 61/4017 137/512.2 |
| 7,390,174 B2 * | 6/2008 | Dinkel | ............... | B60T 8/4031 303/10 |
| 7,478,998 B2 * | 1/2009 | Dinkel | ............... | B60T 8/4031 417/470 |
| 10,422,325 B2 * | 9/2019 | Luczak | ............... | F04B 1/02 |
| 2001/0048884 A1 * | 12/2001 | Siegel | ............... | B60T 8/4031 417/470 |
| 2003/0010386 A1 * | 1/2003 | Doyen | ............... | F16K 15/044 137/515 |
| 2003/0196704 A1 * | 10/2003 | Nakazawa | ............... | B60T 8/341 137/539 |
| 2005/0061372 A1 | 3/2005 | McGrath et al. | | |
| 2005/0217730 A1 * | 10/2005 | Doutt | ............... | F16K 15/044 137/539.5 |
| 2006/0175092 A1 * | 8/2006 | Mashburn | ............... | E21B 21/10 175/57 |
| 2014/0311597 A1 * | 10/2014 | Mooney | ............... | F02M 63/0054 137/539.5 |
| 2016/0215741 A1 * | 7/2016 | Porras | ............... | F02M 63/0036 |
| 2017/0138490 A1 * | 5/2017 | Haeusser | ............... | B60T 8/4031 |

FOREIGN PATENT DOCUMENTS

| | | |
|---|---|---|
| DE | 102009043649 A1 | 3/2011 |
| DE | 10 2012 207 334 A1 | 11/2013 |
| DE | 102012208808 A1 | 11/2013 |
| DE | 102012017953 A1 | 3/2014 |
| FR | 1109027 A | 1/1956 |
| GB | 694138 A | 7/1953 |
| GB | 740193 A | 11/1955 |
| GB | 1218228 A | 1/1971 |
| WO | 2008128839 A1 | 10/2008 |

OTHER PUBLICATIONS

International Search Report for PCT/EP2016/072335, dated Dec. 16, 2016 in English and German Language.

* cited by examiner

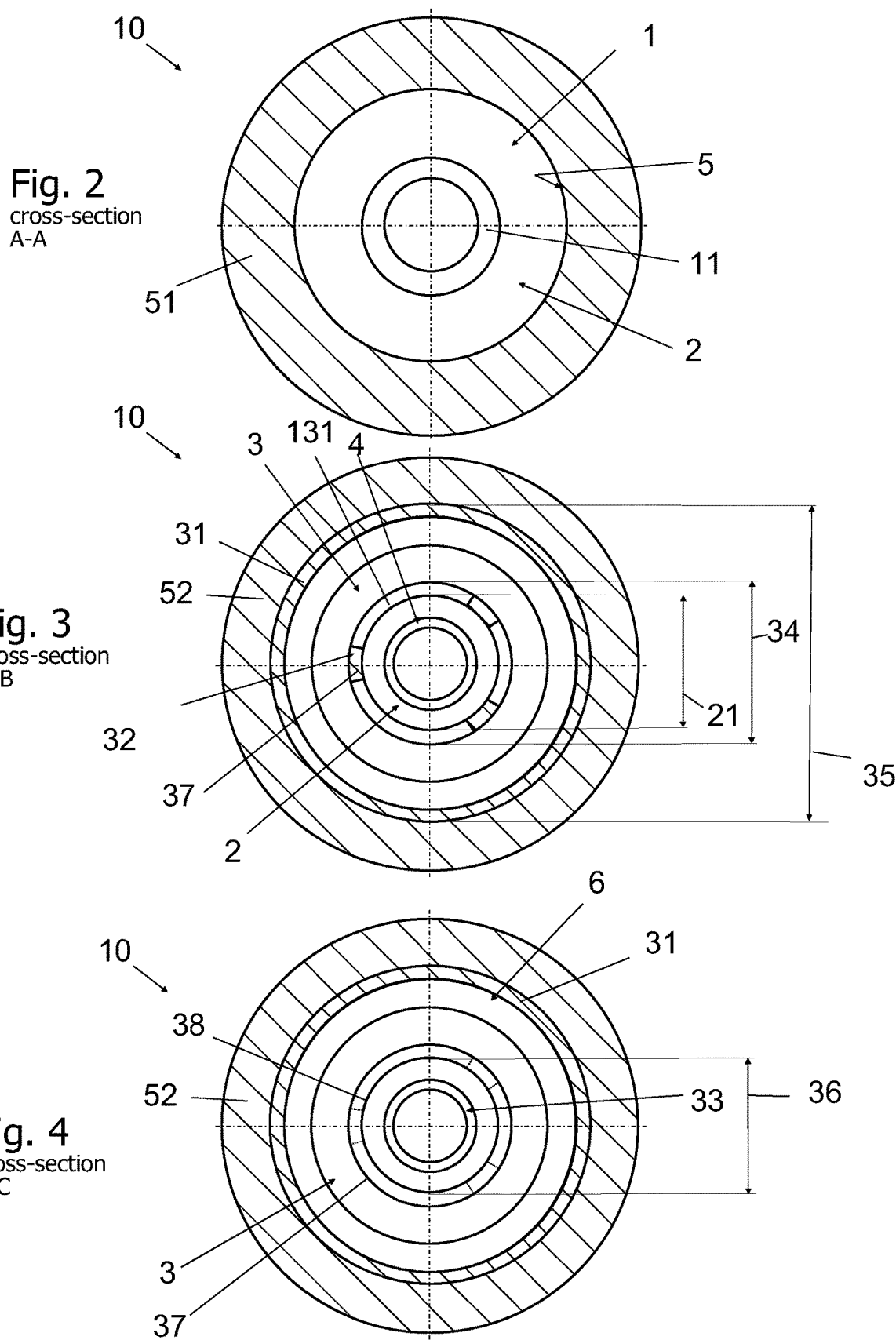

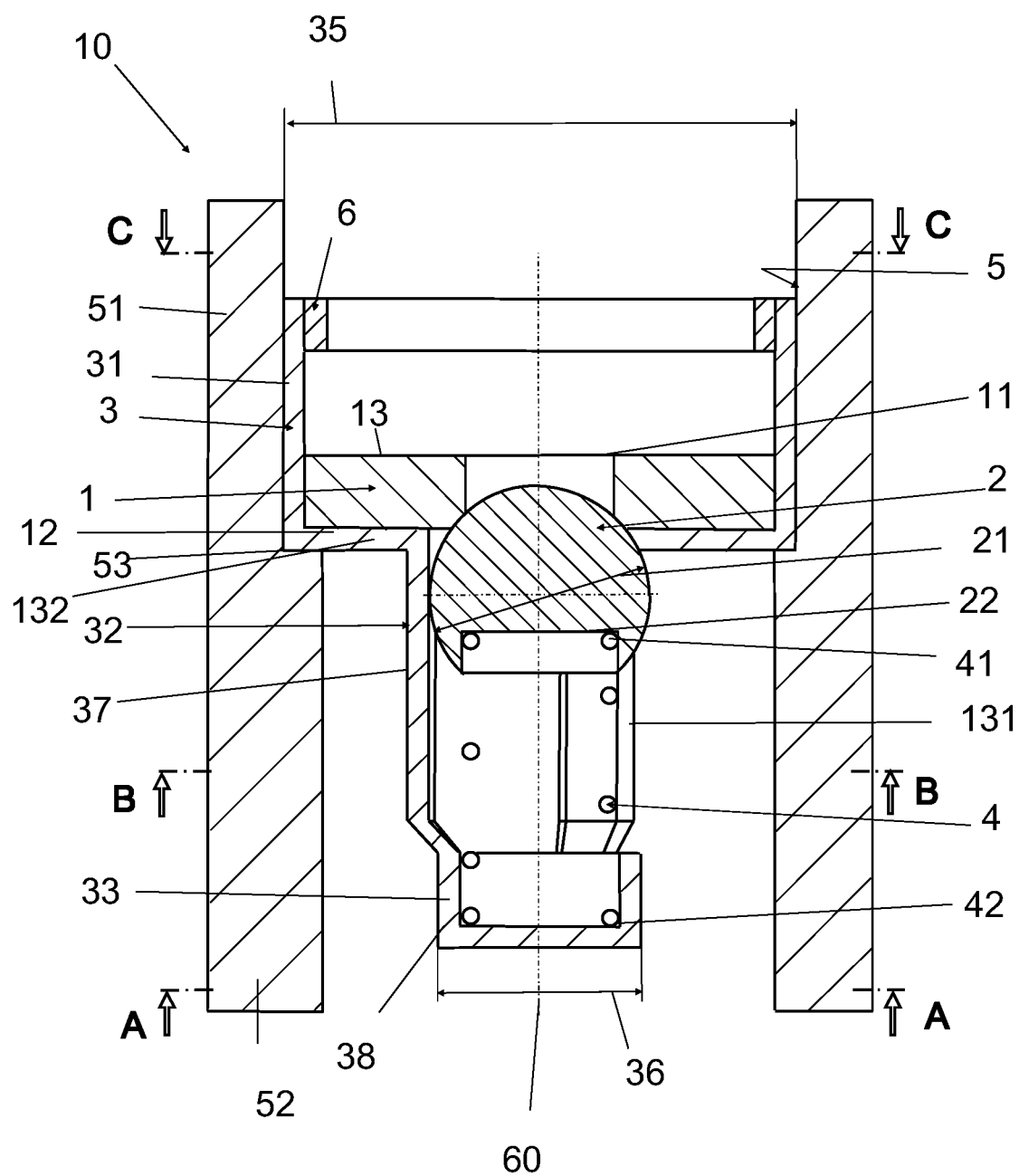

cross-section A-A cross-section B-B

Cross-section C-C

CHECK VALVE

TECHNICAL FIELD

The invention relates to a check valve. Said check valve is pre-assembled and is introduced as a pre-assembled kit into a corresponding opening, which contains a passage for a fluid, that means a gas or a liquid.

DESCRIPTION OF RELATED ART

GB740193A shows a check valve with a sleeve, which is configured at the same time as a valve seat element. GB694138A shows a check valve, which is used as a safety valve, which can be kept normally open and can be closed in case of an overheating in the fluid passage. Said check valve consists of a sleeve, a meltable intermediate element and a separate valve seat element. A spherical valve body is arranged between the sleeve and the meltable intermediate element, whereby the spherical body is pressed by a spring element against the meltable intermediate element. The meltable intermediate element has openings to guide a fluid entering through the sleeve in the direction of the valve seat element and the bore arranged therein. The meltable intermediate element melts upon overheating in the fluid passage, such that the spherical valve body comes to lie directly on the valve seat element and closes the bore. The check valves shown in both documents have to be screwed into a corresponding bore of the fluid passage, which results in elevated manufacturing costs of the check valve and elevated assembly costs when assembled in its location of operation, that means in the fluid passage.

As shown in GB694138A, the sleeve is arranged in an adapter element, of which a first and a second end are shown, whereby each of the first and second ends comprise an external thread. The first end is screwed to a tube, which forms the fluid passage, the second end is received in an internal thread of a second adapter element. The second adapter element has also a first end, which contains the internal thread and a second end, which has an external thread. This external thread is configured to be received in a corresponding second tube. Two adapter elements, a sleeve, a meltable intermediate element, a spring element and a valve seat element are thus required for the manufacture of the valve. Each of the adapter elements has two threads and an own central bore, therefore the manufacture of the adapter elements as well as the valve seat element as well as the sleeve is time consuming and therefore expensive.

In document DE 196 22 123 A1 an example of a check valve is shown which can be squeezed into a bore of a fluid passage. Said check valve consists of a valve carrier, which has a valve seat element for a spherical valve body. The spherical valve body is pressed by a pressure screw spring against the valve seat element. The pressure screw spring is held in a sleeve at the end arranged oppositely to the sphere. The valve seat, the sleeve, the spherical valve body and the helical spring form a unit which can be placed as such into a bore. The sleeve comprises a plurality of indentations on the jacket surface, which can deform elastically during the assembly, such that the sleeve can be pressed into a bore, which has a smaller outer diameter than the jacket surface of the sleeve. The pressure screw spring lies on one of its ends on the sphere, the other end encompasses a pin of the sleeve arranged centrally with respect to the bore. The pin is connected by three arms with the jacket of the sleeve. For this reason, this check valve has a high pressure drop as the flow cross section is reduced by the pin and the corresponding (holding) arms to less than half the flow cross-section of the bore.

All these prior art solutions have in common, that they either consist of a plurality of parts or that they cannot be placed into a bore in a pre-assembled state. Therefore, there is a need for a check valve of a simple configuration, which consists of few parts which can be pre-assembled in such a way, that they can assembled at the desired location in a single work step.

A disadvantage of the solution proposed in DE 196 22 123 A1 is further the large distance of the spherical valve body from the wall of the sleeve, which is functionally required to guarantee a sufficient flow cross-section for the fluid passing the spherical valve body. Once the spherical valve body lifts from the valve seat, the spherical valve body is not anymore axially guided or centered on its valve seat side. Therefore, it is possible that according to this solution, the spherical valve body is deflected with respect to its central or middle position and assumes an undefined slanting position which creates a disturbance for the flow or may even obstruct the flow if the spherical valve body blocks the opening, which forms the discharge for the fluid. The spring element is only guided by the bottom of the sleeve, consequently also the position of the spring element on the spherical valve body is not defined. In order to avoid this effect, a pot-shaped closure piece can be used instead of the spherical valve body. The pot-shaped closure piece comprises a bottom which can close the opening in the valve seat element entirely and a jacket which is guided along the inner wall of the sleeve. However, the pressure drop of such a closure piece as shown in FIG. 4 of WO2008128839 A1 is substantially higher than for a spherical valve body, as no openings can be provided in the bottom thereof and the jacket at least partially closes the openings provided in the sleeve wall, so that the fluid has to flow around the jacket. The sleeve has to be of an increased length to guarantee a sufficient flow cross-section.

It is also known from DE102006007583A to provide a check valve, which has a sleeve-like outer portion and an inner portion received therein. The sleeve-like outer portion comprises a valve seat and a spherical valve body, which is held by a spring element, which is received in the inner portion and guided in said inner portion. As the outer portion also forms a valve seat element, which has to withstand high fluid counter pressures, said outer portion is manufactured with different wall thicknesses, which requires a sophisticated machining thereof resulting in high manufacturing costs for such a solution. The inner portion and the outer portion have to be sealed against the bore in which the check valve is to be received during assembly and to be secured by a securing element, which on one hand requires a multi-stage bore and on the other hand requires a multi-step assembly process due to the adjustment of the seal and the securing element.

It is an object of the invention to provide a check valve which is simple in its manufacture and can be mounted into a fluid channel by a single assembly process step. It is a further object of the invention to provide a check valve which can be mounted in a pre-assembled state into a bore. It is a further object of the invention to provide a check valve of a small length with the lowest possible pressure drop.

SUMMARY OF THE INVENTION

The addressing of objects of the invention is described with reference to the discussion below.

If the term «for instance» is used in the following description, the term relates to embodiments or examples, which is not to be construed as a more preferred application of the teaching of the invention. The terms "preferably" or "preferred" are to be understood such that they relate to an example from a number of embodiments and/or examples which is not to be construed as a more preferred application of the teaching of the invention. Accordingly, the terms "for example", "preferably" or "preferred" may relate to a plurality of embodiments and/or examples.

The subsequent detailed description contains different embodiments of the check valve according to the invention. In the description and the claims, the terms «contain», «comprise», «are configured as» in relation to any technical feature are thus to be understood that they contain the respective feature but are not limited to embodiments containing only this respective feature.

The check valve for reception in a fluid passage comprises a valve seat element, a valve body and a sleeve, whereby the valve body is moveable in such a manner in the sleeve that it is placed in a first position on the valve seat element and in a second position in a distance to the valve seat element.

The check valve for reception in a fluid passage comprises a valve seat element, a valve body and a sleeve, wherein the valve body is moveable in such a manner in the sleeve, that it rests in a first position on the valve seat element and it is arranged a distance with respect to the valve seat element in a second position. The valve seat element contains an opening, which can be closed by the valve body in the first position, wherein a spring element is arranged between the valve body and the sleeve. The spring element has a first end and a second end. The valve body is retained by the spring element in the first position as long as the fluid pressure present in the opening is smaller than the closing force of the spring element. The first end of the spring element is connected to the valve body. The sleeve comprises a first jacket element which is configured to be retained in the passage. The sleeve comprises a second jacket element which is configured to retain the second end of the spring element. The spring element is retained in a pot-shaped opening of the second sleeve element That means, that the spring element is located inside the jacket of the pot-shaped opening. Thereby, the spring element can be guided along the inner wall of the jacket of the pot-shaped opening, such that guiding pin extending almost along the entire length of the spring element is not required as shown for instance in US2005061372 A1. The solution presented in US2005061372 A1 is thus insofar to be considered as disadvantageous as the disclosed spherical valve body can lift only a small distance from the valve seat, whereby only a small flow cross-section can be obtained between the valve body and the valve seat, such that also the pressure drop for the pressure regulator according to US2005061372 A1 operating as a check valve is many times higher than for a check valve according to any of the embodiments of the invention.

According to an embodiment, the first jacket element has an external diameter, which substantially corresponds to the inner diameter of the passage. The second jacket element can comprise a maximum external diameter which is smaller than the maximum external diameter of the first jacket element. The external diameter of the pot-shaped opening can be smaller than the maximum external diameter.

According to an embodiment, the second jacket element comprises a first cylindrical portion and a second cylindrical portion, whereby the second cylindrical portion is configured as a jacket element of the pot-shaped opening. The first cylindrical portion can comprise an inner diameter which corresponds at least to the external diameter of the valve body. The sleeve can comprise an opening which is arranged in the second jacket element.

According to an embodiment, the sleeve can comprise a connection element, which connects the first jacket element to the second jacket element.

According to an embodiment, the valve body can be configured as a spherical valve body. In particular, the valve body can comprise a recess for receiving the first end of the spring element.

According to an embodiment, the second jacket element is received in the first jacket element. The connection element can connect an end of the first jacket element with an end of the second jacket element. The connection element can comprise a shoulder between the end of the first jacket element and the end of the second jacket element. The shoulder of the connection element can be placed onto a shoulder of the valve seat element or can be received in a recess or a groove of the valve seat element. The shoulder of the connection element allows for a positioning of the sleeve during the assembly of the check valve.

According to an embodiment, the connection element is arranged between the first jacket element and the second jacket element. The valve seat element can be arranged inside the first jacket element and can be positioned on the connection element. According to this embodiment, it is possible to position the valve seat element during the assembly of the check valve on the valve body, such that the valve body is securely retained in the second jacket element.

In particular, according to any of the preceding embodiments, the sleeve, the first jacket element and the second jacket element are configured as a single part. The guiding of the spring element and the fixation of the check valve in the passage and the connection to the valve seat element can thereby be achieved by a single part, namely the sleeve. For instance, the sleeve can be retained by a tensioning element in the passage, alternatively or in combination thereto it could be retained in the passage by a force fit or a screw connection.

An advantage of the solution according to the invention according to any of the embodiments is such that the mounting into the fluid passage can be performed in a single working step as the check valve can be pushed in a pre-assembled state into the passage until it rests on a shoulder in the passage. By means of the shoulder arranged in the passage, the exact position of the check valve in the passage is determined. The shoulder of the passage receives according to an embodiment the valve seat element, according to a further embodiment the connection element of the sleeve.

According to an embodiment, a hollow space is arranged between the valve seat element and the sleeve. Due to the hollow space, it is possible that the check valve opens faster. As soon as the opening in the valve seat element is opened, the fluid can enter the hollow space. The hollow space extends advantageously over the entire cross-section of the passage minus the wall thickness of the sleeve at this location. Therefore, a large fluid cross-section is available immediately upon lifting of the valve body.

In particular, the hollow space can be connected to a plurality of openings. The fluid can flow freely from the hollow space into the openings, such that a smaller flow resistance and consequently a surprisingly lower pressure drop is obtainable compared to prior art valves.

In particular, the opening of the valve seat element is connected to the hollow space, if the valve body doesn't close the opening. The possibility of an immediate supply of fluid to the hollow space results in a higher flow rate through the check valve according to the invention compared to conventional check valves immediately after having lifted the valve body from the bore.

This advantage results from the configuration in which the cross-sectional area of the hollow space is larger than the cross-sectional area of the opening. In particular, the cross-sectional area of the hollow space can differ more than 20% from the cross-sectional area of the opening. According to a particularly preferred embodiment, the cross-sectional area of the hollow space can differ more than 30% from the cross-sectional area of the opening, that means, the cross-sectional area of the hollow space is at least 30% larger than the cross-sectional area of the opening. In particular, the cross-sectional area of the hollow space can differ at least 50% from the cross-sectional area of the opening. That means, the cross-sectional area of the hollow space according to this particularly preferred embodiment is at least 50% larger than the cross-sectional area of the opening.

According to an embodiment, the second jacket element and/or the connection element comprise a first cylindrical portion and/or a second cylindrical portion, whereby the first cylindrical portion contains a central opening for the reception of the valve body. The inner diameter of the second cylindrical portion can be smaller than the inner diameter of the first cylindrical portion. Therefore, it is possible to guide the spring element and the valve body exactly.

According to an embodiment, a conical adapter is arranged between the first cylindrical portion and the second cylindrical portion. The inner surface of the conical adapter can be used as a support surface for the valve body if the valve body is in the open position. If a conical adapter is used, a self-centering support surface for the valve body is provided. Additionally, an at least linear contact is provided, such that the pressure and impact forces acting on the support surface are distributed optimally such that no wear of the support surface can result.

According to an embodiment, the second jacket element or the connection element contain a plurality of openings such that the fluid can be discharged rapidly from the hollow space.

According to an embodiment, the second jacket element contains a cup-shaped opening, which can contain an axially symmetrical opening. In particular, the axially symmetrical opening can comprise a diameter which is smaller than the inner diameter of the spring element.

A check valve according to any of the preceding embodiments can be used in any system for fluid transfer. In particular, a check valve can be used in fluid conveying systems, for instance in systems which contain a pump or in systems, in which a fluid pressure is to be raised. Such a check valve may also be used as a pressure limiting valve. The check valve can be used for instance as a hydraulic valve. Further applications for said check valve are to be found in internal combustion machines, in particular of the supply of cooling fluids, lubricants or fuels.

BRIEF DESCRIPTION OF THE DRAWINGS

A number of embodiments of the check valve according to the invention are shown in the subsequent drawings. It is shown in FIG. 1 an axial section through a check valve according to a first embodiment, FIG. 2 a radial section through the check valve according to the first embodiment along the section line A-A, FIG. 3 a radial section through the check valve according to the first embodiment along the section line B-B, FIG. 4 a radial section through the check valve according to the first embodiment along the section line C-C, FIG. 5 an axial section through a check valve according to a second embodiment, FIG. 6 a radial section through the check valve according to the second embodiment along the section line A-A, FIG. 7 a radial section through the check valve according to the second embodiment along the section line B-B, FIG. 8 a radial section through the check valve according to the second embodiment along the section line C-C, FIG. 9 an axial section through a check valve according to a third embodiment, FIG. 10 an axial section through a check valve according to a fourth embodiment, FIG. 11 a view of the check valve according to the fourth embodiment, FIG. 12 an axial section through a check valve according to a fifth embodiment, FIG. 13 a view of the check valve according to the fifth embodiment.

DETAILED DESCRIPTION

Figure 1:
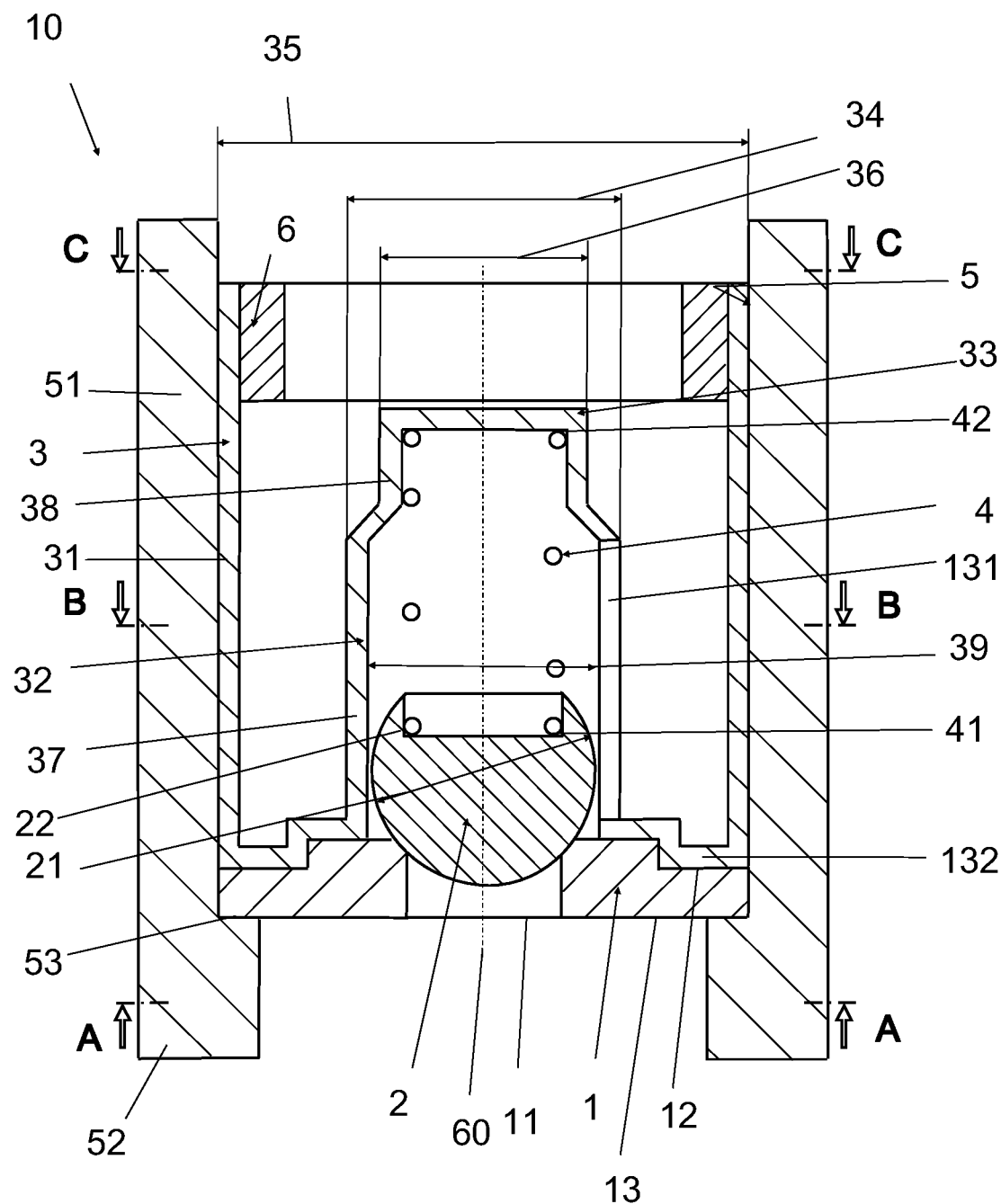

FIG. 1 shows a first view of a check valve 10 according to a first embodiment in a partially sectional view. The check valve 10 is configured to be received in a fluid passage 5. The passage 5 comprises a first passage portion 51 and a second passage portion 52. A shoulder 53 is arranged between the first passage portion 51 and the second passage portion 52. The inner diameter of the first passage portion 51 differs from the inner diameter of the second passage portion 52. The check valve 10 comprises a valve seat element 1 and a valve body 2 and a sleeve 3. The valve body 2 is moveable in the sleeve 3 such that it rests in a first position on the valve seat element 1 and is arranged in a second position at a distance to the valve seat element 1. The valve seat element 1 comprises an opening 11, which can be closed by the valve body 2 in the first position. A spring element 4 is arranged between the valve body 2 and the sleeve 3. The spring element comprises a first end 41 and a second end 42. The valve body 2 is retained by the spring element 4 in the first position, as long as the fluid pressure in the opening 11 is smaller than the closing force of the spring element 4. The first end 41 of the spring element 4 is connected to the valve body 2. The sleeve 3 comprises a first jacket element 31 which is configured to be retained in the passage 5. The jacket element 31 rests according to this embodiment on the inner wall of the first passage portion 51 of the passage 5. The first jacket element 31 in particular has an external diameter 35 which substantially corresponds to the inner diameter of the first passage portion 51 of the passage 5.

The sleeve 3 comprises a second jacket element 32, which is configured to retain the second end 42 of the spring element 4. The second end 42 of the spring element 4 is retained in a pot-shaped opening 33 of the second jacket element 32. The second jacket element 32 thus forms a cage, in which the valve body 2 is moveable. The first jacket element 31 can be connected to the second jacket element 32 by a connection element 132. The connection element 132 can be arranged on a first surface 12 of the valve seat element 1. The valve seat element 1 comprises a second surface 13 arranged oppositely to the first surface 12. The second surface 13 partially rests on the shoulder 53.

The second jacket element 32 can comprise a maximum external diameter 34 which is smaller than the maximum external diameter 35 of the first jacket element 31. The external diameter 36 of the pot-shaped opening 33 is in particular smaller than the maximum external diameter 35.

The second jacket element 32 comprises according to the embodiment of FIG. 1 a first cylindrical portion 37 and a second cylindrical portion 38. The first cylindrical portion 37 can comprise a plurality of bar-shaped elements which delimit at least one opening 131 laterally. According to the current embodiment, three openings 131 are provided. The openings 131 are in particular of the same size, such that a fluid can pass through the openings 131 if the valve body 2 is separated from the valve seat element 1. If the valve body 2 is lifted from the valve seat element 1 by the pressure of the supplied fluid, the spring element 4 is squeezed. The valve body 2 is guided in the second jacket element 32. The valve body 2 is configured in particular as a spherical valve body. The first end 41 of the spring element 4 is retained in the opening 22 of the valve body 2. According to an embodiment not shown in the drawings, the first end 41 of the spring element 4 can also rest on the surface of the valve body 2.

The sleeve 3 comprises a connection element 132, which connects the first jacket element 31 to the second jacket element 32.

The cylindrical portion 38 is configured in particular as a jacket element of the pot-shaped opening 33. The pot-shaped opening can be formed by a plurality of bar-shaped elements according to an embodiment not shown in the drawings, which extend from the connection element 132 to the end of the pot-shaped opening 33.

The first cylindrical portion 37 comprises according to this embodiment an inner diameter 39 which corresponds at least to the external diameter 21 of the valve body 2.

FIG. 2 shows a radial section through the check valve 10 according to the first embodiment along the section line A-A. The direction of view is selected to be in the direction of flow of the fluid. The passage 5 comprises the valve seat element 1, which is configured to be an annular disk element. The annular disk element comprises a central opening 11 which extends along the central axis 60 of the passage 5. The fluid reaches the surface of the valve body 2 normally closing the opening 11 via this opening. Upon sufficient fluid pressure, the valve body 2 is lifted from the opening 11, such that an annular gap is formed through which the fluid can flow into the intermediate space between the first jacket element 31 and the second jacket element 32, see also FIG. 1. The circumference of the valve body 2 is shown in FIG. 2 in dotted lines as the valve body 2 is partially covered by the valve seat element 1.

FIG. 3 shows a radial section through the check valve 10 according to the first embodiment along the section line B-B whereby the direction of view is selected to be opposite to the direction of flow of the fluid. The sleeve 3 is arranged in the passage 5, wherein said first jacket element 31 rests at the inner wall of the passage 5. In FIG. 2, the second passage portion 52 of the passage 5 is shown in section, which has a larger inner diameter than the first passage portion 51 of the passage 5 shown in FIG. 2. The second jacket element 32 of the sleeve 3 consists of three bar-shaped elements at the location of the section, wherein an opening 131 is provided between each of those. A spring element 4 is arranged in the interior of the second jacket element 32, which rests on the valve body 2 or is received in an opening thereof.

FIG. 4 shows a radial section through the check valve 10 according to the first embodiment along the section line C-C whereby the direction of view is selected to be opposite to the direction of flow of the fluid. The first jacket element 31 of the sleeve 3 is retained by a tensioning element 6 in the second portion of the passage 5. The first jacket element 31 can be pressed against the inner wall of the second passage portion 52 of the passage 5, such that the check valve 10 is retained in the passage 5 in the intended mounting position. A press-fit or a threaded connection can be provided instead of a tensioning element.

The cover of the pot-shaped opening 33 is shown in FIG. 4 as well, in which the second end 42 of the spring element 4 is retained, which is covered by the cover. The second cylindrical portion 38 of the second jacket element 32 is jointly connected to the cover of the pot-shaped opening 33. The external diameter 36 of the second cylindrical portion 38 is shown in FIG. 4.

FIG. 5 shows a first view of a check valve 10 according to a second embodiment in an axial sectional view. Corresponding or equivalent elements are provided in this view with the same reference numerals as in the embodiment shown in one of FIGS. 1 to 4. The check valve 10 is configured to be received in a passage 5, wherein a fluid can flow. The passage 5 comprises a first passage portion 51 and a second passage portion 52. A shoulder 53 is arranged between the first passage portion 51 and the second passage portion 52. The inner diameter of the first passage portion 51 differs from the inner diameter of the second passage portion 52. The check valve 10 comprises a valve seat element 1 and a valve body 2 and a sleeve 3. The valve body 2 is moveable in the sleeve 3 such that it rests in a first position on the valve seat element 1 and is arranged in a second position at a distance to the valve seat element 1. The valve seat element 1 comprises an opening 11, which can be closed by the valve body 2 in the first position. A spring element 4 is arranged between the valve body 2 and the sleeve 3. The spring element comprises a first end 41 and a second end 42. The valve body 2 is retained by the spring element 4 in the first position, as long as the fluid pressure in the opening 11 is smaller than the closing force of the spring element 4. The first end 41 of the spring element 4 is connected to the valve body 2. The sleeve 3 comprises a first jacket element 31 which is configured to be retained in the passage 5. The jacket element 31 rests according to this embodiment on the inner wall of the first passage portion 51 of the passage 5. The first jacket element 31 in particular has an external diameter 35 which substantially corresponds to the inner diameter of the first passage portion 51 of the passage 5.

The sleeve 3 comprises a second jacket element 32, which is configured to retain the second end 42 of the spring element 4. The second end 42 of the spring element 4 is retained in a pot-shaped opening 33 of the second jacket element 32. The second jacket element 32 thus forms a cage, in which the valve body 2 is moveable. The first jacket element 31 can be connected to the second jacket element 32 by a connection element 132. The connection element 132 can be arranged on a first surface 12 of the valve seat element 1. The valve seat element 1 comprises a second surface 13 arranged oppositely to the first surface 12. The first surface 12 rests on the connection element 132 and is received in the first jacket element 31 of the sleeve 3. The connection element 132 rests at least partially on the shoulder 53 on the side arranged oppositely to the valve seat element 1.

The second jacket element 32 can comprise a maximum external diameter 34 (see FIG. 7) which is smaller than the maximum external diameter 34 of the first jacket element 31. The external diameter 36 (see FIG. 6) of the pot-shaped opening 33 is in particular smaller than the maximum external diameter 35.

The second jacket element 32 according to the embodiment of FIG. 5 comprises a first cylindrical portion 37 and a second cylindrical portion 38. The first cylindrical portion 37 can comprise a plurality of bar-shaped elements, which delimit at least an opening 131 laterally. According to the current embodiment, three openings 131 are provided. The openings 131 are in particular of the same size, such that a fluid can pass through the openings 131 if the valve body 2 is separated from the valve seat element 1. If the valve body 2 is lifted from the valve seat element 1 by the pressure of the entering fluid, the spring element 4 is squeezed. The valve body 2 is guided in the second jacket element 32. The valve body 2 is configured in particular as a spherical valve body. The first end 41 of the spring element 4 is retained in the opening 22 of the valve body 2. According to an embodiment not shown in the drawings, the first end 41 of the spring element 4 can also rest on the surface of the valve body 2.

The sleeve 3 comprises a connection element 132, which connects the first jacket element 31 to the second jacket element 32. The fluid flows in the passage 5 from the first passage portion 51 to the second passage portion 52, in the drawing downwardly. The first jacket element 31 extends according to this embodiment upstream of the connection element 132. The valve seat element 1 is arranged inside the first jacket element 31 and rests on the connection element 132.

The second jacket element 32 extends downstream of the connection element 132. The cylindrical portion 38 of the second jacket element 32 is configured in particular as a jacket element of the pot-shaped opening 33. The pot-shaped opening 33 can be formed according to an embodiment not shown in the drawings of a plurality of bar-shaped elements, which extend from the connection element 132 to the end of the pot-shaped opening 33. The first cylindrical portion 37 comprises according to the current embodiment an inner diameter 39 (see FIG. 7), which corresponds at least to the external diameter 21 of the valve body 2.

Figure 6:
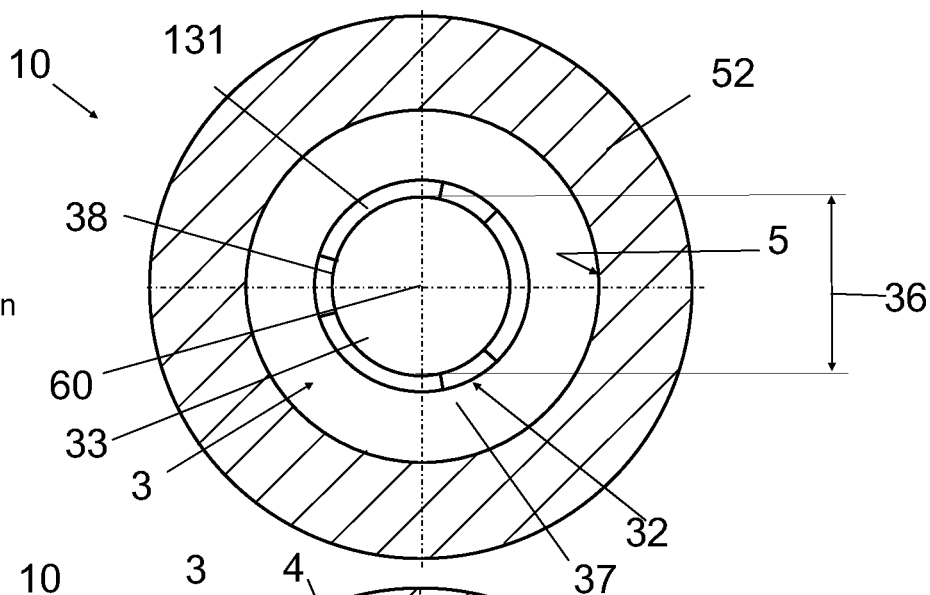

FIG. 6 shows a radial section through the check valve 10 according to the second embodiment along the section line A-A. The direction of view is selected to be opposite to the direction of flow of the fluid. According to FIG. 6, the second passage portion 52 of the passage 5 is shown in section, which has a smaller inner diameter than the first passage portion 51 of the passage 5 shown in FIG. 5 or FIG. 8. The second jacket element 32 consists at the location of the section of three bar-shaped elements, which each comprise an opening 131. The spring element 4 is arranged in the interior of the second jacket element 32, which rests on the valve body 2 or is received in an opening thereof. The spring element 4 is not visible in this drawing, as it is covered by the cover of the pot-shaped opening 33. The second cylindrical portion 38 of the second jacket element 32 is connected to the cover of the pot-shaped opening 33. The external diameter 36 of the second cylindrical portion 38 is shown in FIG. 6.

Figure 7:
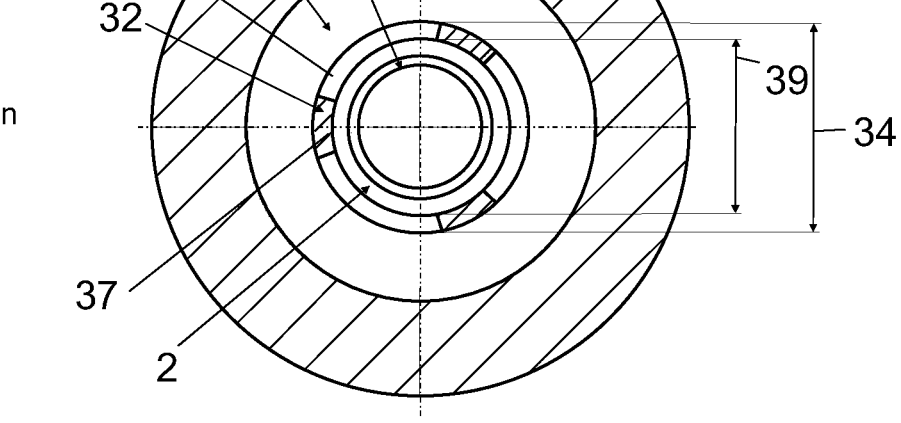

FIG. 7 shows a radial section through the check valve 10 according to the second embodiment along the section line B-B whereby the direction of view is selected to be opposite to the direction of flow of the fluid. The cover of the pot-shaped opening 33 is not shown in FIG. 7 as it is located in front of the sectional plane. The second jacket element 32 of the sleeve 3 consists at the location of the section of three bar-shaped elements, which each comprise an opening 131. The spring element 4 is arranged in the interior of the second jacket element 32, which rests on the valve body 2 or is received in an opening thereof. The first cylindrical portion 37 has according to FIG. 7 the external diameter 34 and the inner diameter 39. The external diameter 21 (see FIG. 5) of the valve body 2 is the same or smaller than the inner diameter 39, such that the valve body 2 is moveable inside the cylindrical portion 37 of the second jacket element 32.

Figure 8:
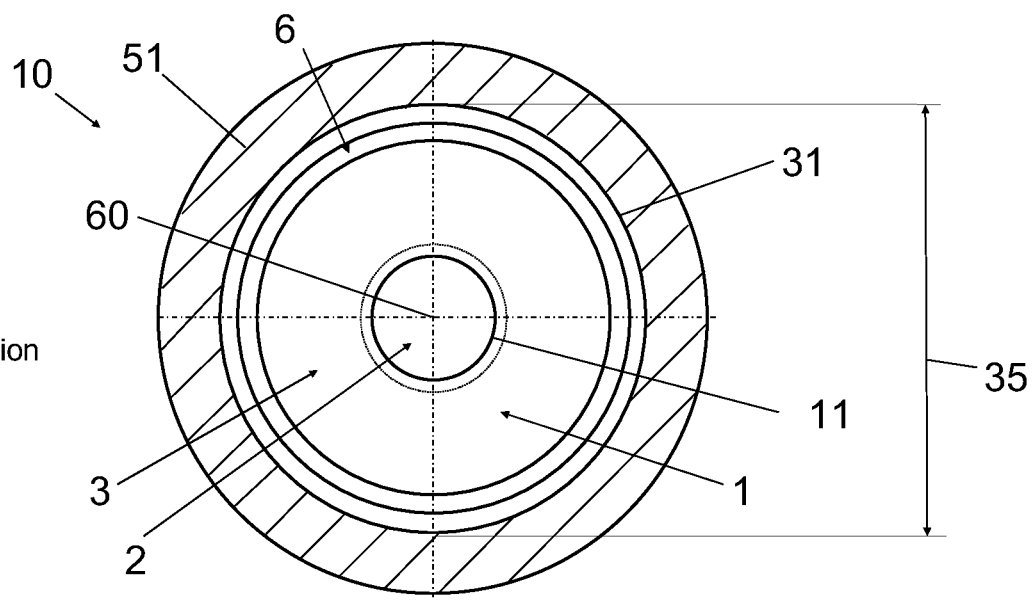

FIG. 8 shows a radial section through the check valve 10 according to the second embodiment along the section line C-C whereby the direction of view is selected to be opposite to the direction of flow of the fluid. The sleeve 3 is arranged in the passage 5, whereby its first jacket element 31 rests on the inner wall of the passage 5. The first jacket element 31 of the sleeve 3 is retained by a tensioning element 6 in the first passage portion 51 of the passage 5. The first jacket element 31 can be pressed against the inner wall of the first passage portion 51 of the passage 5, such that the check valve 10 is retained in the passage 5 in the intended mounting position. The tensioning element 6 shown in FIG. 8 can extend to the second surface 13 of the valve seat element 1, such that the valve seat element 1 can be retained with its first surface 12 resting on the surface of the connection element 132, even if in addition to the pressure, which is exerted by the spring element 4 on the valve seat element 1, a fluid pressure in the second passage portion 52 of the passage 5 acts, which will be higher than the fluid pressure in the first portion of the passage 5. According to an embodiment not shown in the drawings, the tensioning element is formed by the valve seat element 1.

The passage 5 comprises the valve seat element 1, which is configured to be an annular disk element. The annular disk element comprises a central opening 11 which extends along the central axis 60 of the passage 5. The fluid reaches the surface of the valve body 2 normally closing the opening 11 via this opening. Upon sufficient fluid pressure, the valve body 2 is lifted from the opening 11, such that an annular gap is formed through which the fluid can flow into the intermediate space between the second passage portion 52 of the passage 5 and the second jacket element 32, see also FIG. 5. The circumference of the valve body 2 is shown in FIG. 8 in dotted lines as the valve body 2 is partially covered by the valve seat element 1.

Figure 9:
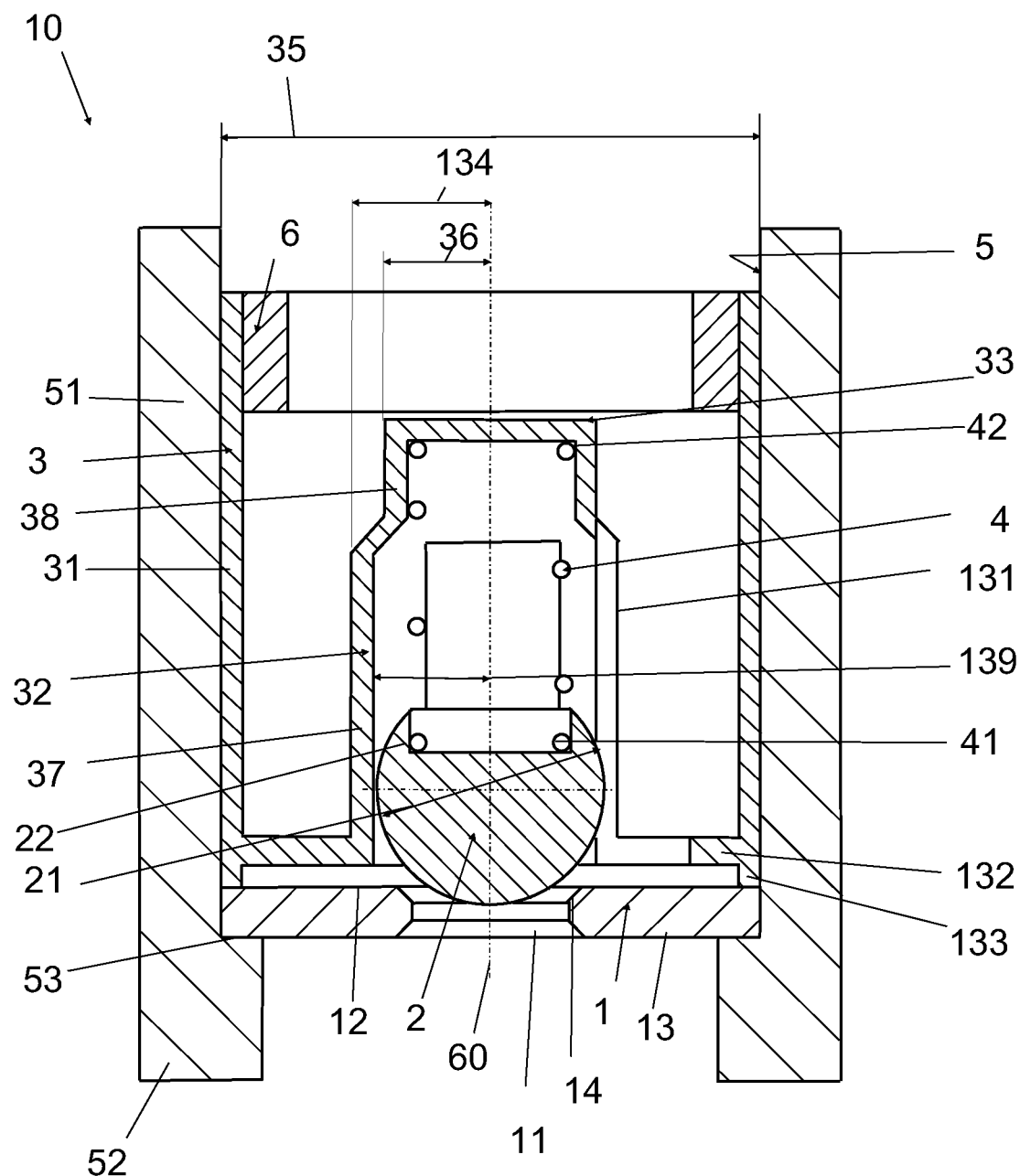

FIG. 9 shows a first view of a check valve 10 according to a third embodiment in an axial sectional view. Corresponding or equivalent elements are provided in this view with the same reference numerals as in the embodiment shown in one of FIGS. 1 to 8. The check valve 10 is configured to be received in a passage 5, wherein a fluid can flow. The passage 5 comprises a first passage portion 51 and a second passage portion 52. A shoulder 53 is arranged between the first passage portion 51 and the second passage portion 52. The inner diameter of the first passage portion 51 differs from the inner diameter of the second passage portion 52. The check valve 10 comprises a valve seat element 1 and a valve body 2 and a sleeve 3. The valve body 2 is moveable in the sleeve 3 such that it rests in a first position on the valve seat element 1 and is arranged in a second position at a distance to the valve seat element 1. The valve seat element 1 comprises an opening 11, which can be closed by the valve body 2 in the first position. In FIG. 9, the transition from the first position to the second position is shown, whereby the valve body 2 is in a distance from the valve seat 14 of the valve seat element 1 due to the pressure of the fluid entering the opening 11. A spring element 4 is arranged between the valve body 2 and the sleeve 3. The spring element comprises a first end 41 and a second end 42. The valve body 2 is retained by the spring element 4 in the first position as long as the fluid pressure in the opening 11 is smaller than the closing force of the spring element 4. The first end 41 of the spring element 4 is connected to the valve body 2. The sleeve 3 comprises a first jacket element 31 which is configured to be retained in the passage 5. The first jacket element 31 in particular has an external diameter 35 which substantially corresponds to the inner diameter of the first passage portion 51 of the passage 5.

The sleeve 3 comprises a second jacket element 32, which is configured to retain the second end 42 of the spring element 4. The second end 42 of the spring element 4 is retained in a pot-shaped opening 33 of the second jacket element 32. The second jacket element 32 thus forms a cage, in which the valve body 2 is moveable. The first jacket element 31 can be connected to the second jacket element 32 by a connection element 132. The connection element 132 is arranged at a distance to the first surface 12 of the valve seat element 1 according to this embodiment. The connection element 132 is arranged at a distance to the first surface 12 of the valve seat element 1 according to this embodiment. A protrusion 133 of the first jacket element 131 rests on the second surface 12. An opening is bounded by the protrusion 133, the first surface 12 of the valve seat element 1 and the connection element 132, which is open for fluid flow if the valve body 2 is separated from the valve seat 14. The fluid can flow along the valve body 2 into the opening and reaches the openings 131. Thereby a large fluid cross-section is provided already upon entry of the fluid into the openings 131, such that only a small pressure drop results at this location. The pressure drop can hence still be further reduced compared to the preceding embodiments. The principal pressure drop is caused by the opening 11, in which the valve body 2 is retained in the closed state.

The valve seat element 1 comprises a second surface 13 arranged opposite to the first surface 12. The second surface 13 forms a surface facing the fluid flow. The fluid flows according to the drawing upwardly and parallel to the central axis 60.

The second jacket element 32 can comprise a maximum external diameter which is smaller than the maximum external diameter 34 of the first jacket element 31. In this drawing, the radius 134 of the second jacket element is shown instead of the external diameter as the diameter can't be shown due to the right hand opening 131. The same holds true for the external diameter 36 (see FIG. 1 or FIG. 6) for which the radius 136 is shown in this figure. The external diameter 36 (see FIG. 6) of the pot-shaped opening 33 is also in this embodiment smaller than the maximum external diameter 35.

The second jacket element 32 according to the embodiment of FIG. 9 comprises a first cylindrical portion 37 and a second cylindrical portion 38. The first cylindrical portion 37 can comprise a plurality of bar-shaped elements, which delimit at least an opening 131 laterally. According to the current embodiment, three openings 131 are provided. The openings 131 are in particular of the same size, such that a fluid can pass through the openings 131 if the valve body 2 is separated from the valve seat element 1. If the valve body 2 is lifted from the valve seat element 1 by the pressure of the entering fluid, the spring element 4 is squeezed. The valve body 2 is guided in the second jacket element 32. The valve body 2 is configured in particular as a spherical valve body. The first end 41 of the spring element 4 is retained in the opening 22 of the valve body 2. According to an embodiment not shown in the drawings, the first end 41 of the spring element 4 can also rest on the surface of the valve body 2.

The fluid flows in the passage 5 from the second passage portion 52 to the first passage portion 51 in the drawing in upward direction. The first jacket element 31 extends according to this embodiment downstream of the connection element 132 with the exception of the protrusion 133. The second jacket element 32 extends downstream of the connection element 132. The cylindrical portion 38 of the second jacket element 32 is configured in particular as a jacket element of the pot-shaped opening 33. The pot-shaped opening 33 can comprise according to an embodiment not shown in the drawings a plurality of bar-shaped elements, which extend from the connection element 132 to the end of the pot-shaped opening 33. The first cylindrical portion 37 comprises according to this embodiment an inner diameter 39 (see FIG. 1), which corresponds at least to the external diameter 21 of the valve body 2. The inner radius 139 is shown in FIG. 9 instead of the inner diameter 39.

The sleeve 3 comprises the connection element 132, which connects the first jacket element 31 to the second jacket element 32. In particular, according to any of the preceding embodiments, the sleeve 3, the first jacket element 31 and the second jacket element 32 are formed as a monolithic part. The sleeve 3 can comprise at least one of a plastic material or a metal. If the sleeve 3 is made from a plastic material, it can be manufactured for instance by an injection molding method. If the sleeve 3 is made of metal, it can be manufactured by forming, wherein the openings 131 are manufactured after forming. The openings can for instance be drilled, cut, punched or milled.

According to any of the preceding embodiments the tensioning element can exert a pressurizing force on the sleeve 3, such that the sleeve, in particular the external wall of the first jacket element 31 is locked in the opening forming the first passage portion 51. The sleeve 3 can comprise at least a projection, for instance a dented groove. The projection can be arranged in particular on the external wall of the first jacket element 31, which is not shown in the drawings. The check valve can be securely retained in the passage 5 also at pressures of more than 1000 bars.

Figure 10:
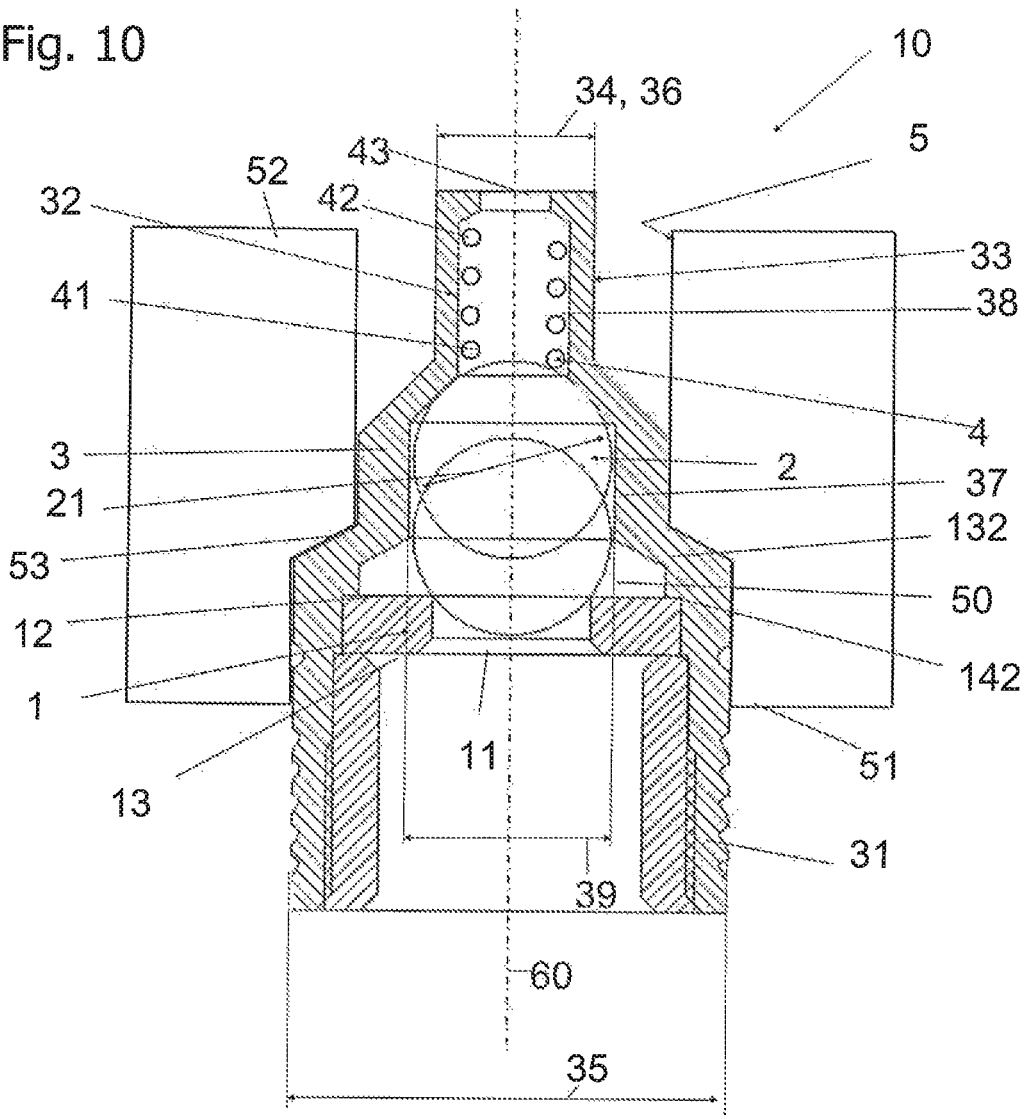

FIG. 10 shows a longitudinal section of a check valve 10 according to a fourth embodiment. The check valve 10 is configured to be received in a passage 5, wherein a fluid can flow. The passage 5 comprises a first passage portion 51 and a second passage portion 52. A shoulder 53 is arranged between the first passage portion 51 and the second passage portion 52. The inner diameter of the first passage portion 51 differs from the inner diameter of the second passage portion 52.

The check valve 10 comprises a valve seat element 1 and a valve body 2 and a sleeve 3, The valve body 2 is moveable in the sleeve 3 such that it rests in a first position on the valve seat element 1 and is arranged in a second position at a distance to the valve seat element 1. The valve seat element 1 comprises an opening 11, which can be closed by the valve body 2 in the first position. A spring element 4 is arranged between the valve body 2 and the sleeve 3. The spring element comprises a first end 41 and a second end 42. The valve body 2 is retained by the spring element 4 in the first position, as long as the fluid pressure in the opening 11 is smaller than the closing force of the spring element 4 and optionally the weight of the valve body 2. In the first position, the valve body 2 closes the opening 11, such that the passage of fluid is prevented. The first end 41 of the spring element 4 is connected to the valve body 2. The sleeve 3 comprises a first jacket element 31 which is configured to be retained in the passage 5.

The jacket element 31 comprises according to this embodiment an external thread, which engages in an inner thread on the inner wall of the first passage portion 51 of the passage 5, what is not shown in the drawings.

The first jacket element 31 in particular has an external diameter 35 which substantially corresponds to the inner diameter of the first passage portion 51 of the passage 5.

The sleeve 3 comprises a second jacket element 32, which is configured to retain the second end 42 of the spring element 4. The second end 42 of the spring element 4 is retained in a pot-shaped opening 33 of the second jacket element 32. The second jacket element 32 thus forms a cage, in which the spring element 4 is moveable. The first jacket element 31 can be connected to the second jacket element 32 by a connection element 132.

The connection element 132 comprises a shoulder 142 which is configured to receive the valve seat element 1. The valve seat element 1 is configured as an annular element, which comprises the opening 11. The valve seat element 1 comprises a second surface 13 arranged oppositely to the first surface 12.

A distance is provided between the first surface 12 of the valve seat element 1 and the oppositely arranged front surface of the connection element 132. A hollow space 50 is formed by this distance between the valve seat element 1 and the sleeve 3, which can be filled with fluid when in operation.

The second jacket element 32 can comprise a maximum external diameter 34 which is smaller than the maximum external diameter 35 of the first jacket element 31. The external diameter 36 of the pot-shaped opening 33 is in particular smaller than the maximum external diameter 35.

The second jacket element 32 comprises according to the embodiment of FIG. 10 a first cylindrical portion 37 and a second cylindrical portion 38. The connection element 132 is connected to the first cylindrical portion 37. The first cylindrical portion 37 forms a central opening for the reception of the valve body 2, As the diameter of the spring element 4 is smaller than the diameter 21 of the valve body 2, the inner diameter of the second cylindrical portion 38 is smaller than the inner diameter of the first cylindrical portion 37. A conical adapter is arranged between the first cylindrical portion 37 and the second cylindrical portion 38. The inner surface of the conical adapter can be used as a support surface for the valve body 2, if the valve body 2 is in the open position. The fluid flows from the hollow space 50 past the underside of the valve body into the openings 40, from which it enters the second passage portion 52 of the passage 5. Thereby, a check valve for an advancing fluid flow is provided.

Figure 11:
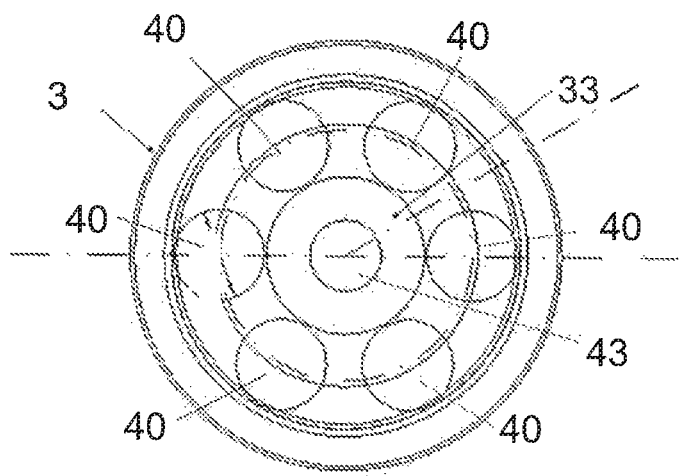

The sleeve 3, in particular the connection element 132, can comprise a plurality of openings 40. The openings can be arranged in the conical adapter, they can also be configured as gaps or openings in at least one of the first or second cylindrical portions 37, 38. According to the current embodiment, six openings 40 are provided which is shown in FIG. 11. The openings 40 are particularly of the same size. The fluid can pass through the openings 40, if the valve body 2 is separated from the valve seat element 1. If the valve body 2 is lifted from the valve seat element 1 by the pressure of the entering fluid, the spring element 4 is squeezed. The valve body 2 is guided in the first cylindrical portion 37 in the second jacket element 32 or in the connection element 132 respectively. The valve body 2 is configured in particular as a spherical valve body. The first end 41 of the spring element 4 rests on the surface of the valve body 2. The first cylindrical portion 37 comprises according to this embodiment an inner diameter 39 which corresponds at least to the external diameter 21 of the valve body 2.

The hollow space 50 is connected to a plurality of openings 40. The opening 11 is connected to the hollow space 50, if the valve body 2 doesn't close the opening 11. A fluid entering through the opening flows through the opening 11 into the hollow space 50 and is directed through the hollow space 50 to the openings 40, from where it enters the second passage portion 52 of the passage 5.

The cross-section of the hollow space 50 is greater than the cross-section of the opening 11, such that the fluid can expand rapidly into the hollow space 50. For this reason, the check valve according to the invention can surprisingly be switched much more rapidly from the closed state to the open state than conventional check valves. A check valve according to the invention has therefore a substantially smaller response time compared to conventional check valves, such that a substantially reduced switching period is achievable.

The cylindrical portion 38 is configured in particular as a jacket element of the pot-shaped opening 33. The pot-shaped opening 33 can be formed by a plurality of bar-shaped elements according to an embodiment not shown in the drawings, which extend from the connection element 132 to the end of the pot-shaped opening 33. The pot-shaped opening according to FIG. 12 comprises a bottom bounded by the cylindrical portion 38, which contains an opening 43. This opening 43 can in particular be arranged about the central axis 60 rotationally symmetrically.

FIG. 11 shows a view of the check valve 10 according to FIG. 10 in a view from the downstream side of the valve, thus in a view from the second passage portion 52 of the passage 5. The passage 5 is omitted in FIG. 11, therefore FIG. 11 only shows a view of the sleeve 3.

Figure 12:
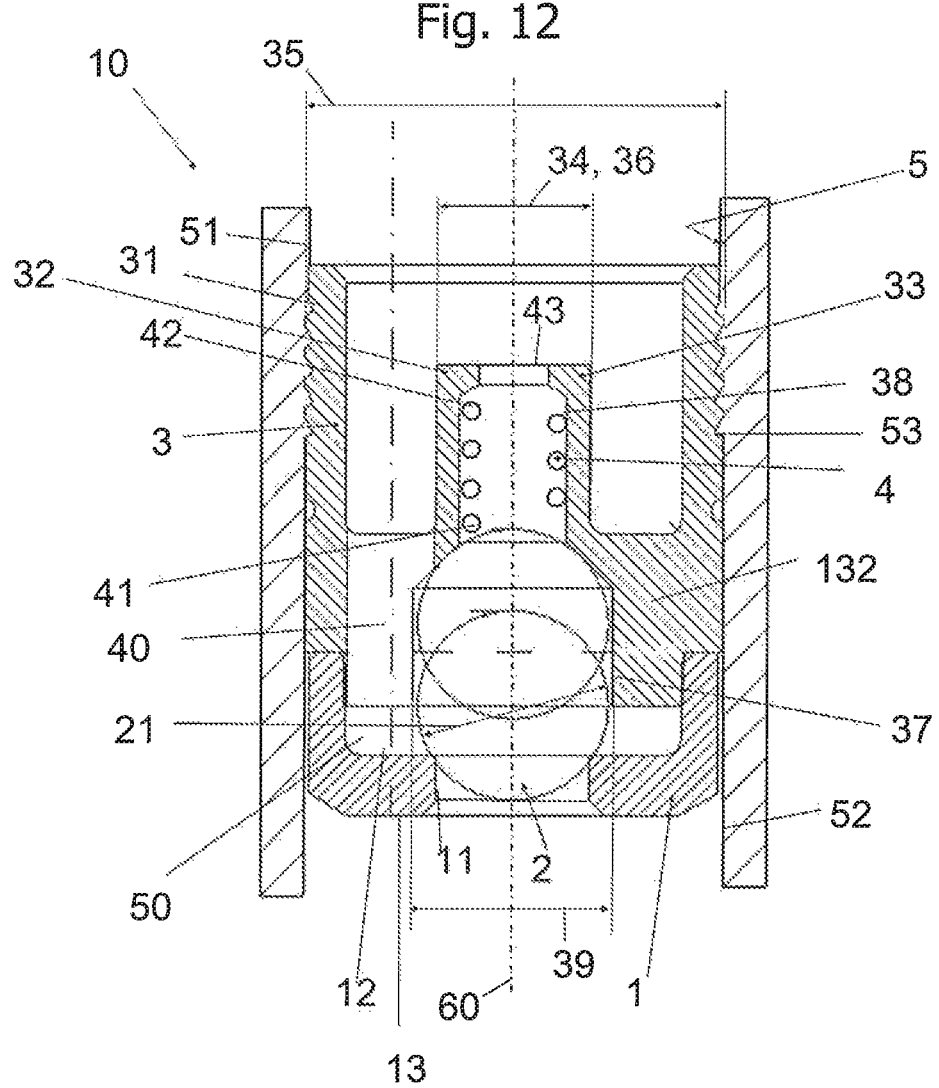

FIG. 12 shows, in a partially sectional view, a first view of a check valve 10 according to a another embodiment. The check valve 10 is configured to be received in a fluid passage 5. The passage 5 comprises a first passage portion 51 and a second passage portion 52. A shoulder 53 is arranged between the first passage portion 51 and the second passage portion 52. The inner diameter of the first passage portion 51 differs from the inner diameter of the second passage portion 52 which is suggested in this figure by the external thread of the first jacket element 31 shown in section. The shoulder 53 can be formed by the thread run. The check valve 10 comprises a valve seat element 1 and a valve body 2 and a sleeve 3. The valve body 2 is moveable in the sleeve 3 such that it rests in a first position on the valve seat element 1 and is arranged in a second position at a distance to the valve seat element 1. The valve seat element 1 comprises an opening 11, which can be closed by the valve body 2 in the first position. A spring element 4 is arranged between the valve body 2 and the sleeve 3. The spring element comprises a first end 41 and a second end 42. The valve body 2 is retained by the spring element 4 in the first position, as long as the fluid pressure in the opening 11 is smaller than the closing force of the spring element 4 and optionally the weight of the valve body 2. The first end 41 of the spring element 4 is connected to the valve body 2. The sleeve 3 comprises a first jacket element 31 which is configured to be retained in the passage 5. The first jacket element 31 comprises according to this embodiment an external thread which engages with a corresponding inner thread arranged on the inner wall of the first passage portion 51 of the passage 5. The first jacket element 31 in particular has an external diameter 35 which substantially corresponds to the inner diameter of the first passage portion 51 of the passage 5.

The sleeve 3 comprises a second jacket element 32, which is configured to retain the second end 42 of the spring element 4. The second end 42 of the spring element 4 is retained in a pot-shaped opening 33 of the second jacket element 32. The second jacket element 32 thus forms a cage, in which the valve body 2 is moveable. The first jacket element 31 can be connected to the second jacket element 32 by a connection element 132. The connection element 132 comprises a shoulder which is configured to receive the valve seat element 1. The valve seat element 1 is configured as a cap-shaped element, which contains the opening 11. The valve seat element 1 comprises a circumferential edge, which can be clipped or screwed on the shoulder of the connection element 132. The edge can comprise an inner thread, which can be engaged with the corresponding external thread of the connection element 132. The connection between the edge and the shoulder can be obtained also by a press-fit.

A distance is provided between the first surface 12 of the valve seat element 1 and the oppositely arranged front surface of the connection element 132. A hollow space is formed by this distance between the valve seat element 1 and the sleeve 3, in particular the connection element 132, which can be filled with fluid when in operation. The valve seat element 1 comprises a second surface 13 arranged oppositely to the first surface 12.

The second jacket element 32 can comprise a maximum external diameter 34 which is smaller than the maximum external diameter 35 of the first jacket element 31. The external diameter 36 of the pot-shaped opening 33 is in particular smaller than the maximum external diameter 35.

The second jacket element 32 comprises according to the embodiment of FIG. 12 a first cylindrical portion 37 and a second cylindrical portion 38. The sleeve 3 comprises a connection element 132, which connects the first jacket element 31 to the second jacket element 32. The first cylindrical portion 37 is arranged inside the connection element 132. The first cylindrical portion 37 contains a central opening for the reception of the valve body 2. As the diameter of the spring element 4 is smaller than the diameter 21 of the valve body 2, the inner diameter of the second cylindrical portion 38 is smaller than the inner diameter of the first cylindrical portion 37. A conical adapter is arranged between the first cylindrical portion 37 and the second cylindrical portion 38. The inner surface of the conical adapter can be used as a support surface for the valve body 2, if the valve body 2 is in the open position. The fluid flows from the hollow space 50 past the underside of the valve body into the openings 40, from which it enters the first passage portion 51 of the passage 5. The direction of fluid flow is thus opposite with respect to the direction of fluid flow of FIG. 10, 11. Thereby, a check valve for a reversely directed fluid flow is provided.

Figure 13:
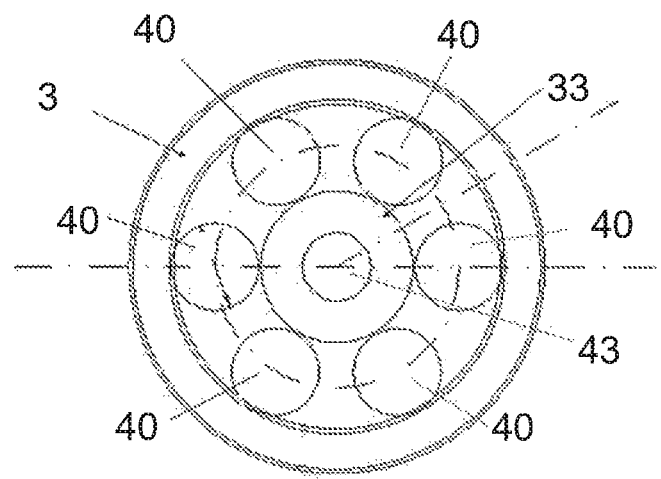

The sleeve 3, in particular the connection element 132 can comprise a plurality of openings 40. According to the current embodiment, six openings 40 are provided which is shown in FIG. 13. The openings 40 are particularly of the same size. The fluid can pass the openings 40, if the valve body 2 is separated from the valve seat element 1. If the valve body 2 is lifted from the valve seat element 1 by the pressure of the entering fluid, the spring element 4 is squeezed. The valve body 2 is guided in the first cylindrical portion 37 in the second jacket element 32 or in the connection element 132 respectively. The valve body 2 is configured in particular as a spherical valve body. The first end 41 of the spring element 4 rests on the surface of the valve body 2.

The first cylindrical portion 37 comprises according to this embodiment an inner diameter 39 which corresponds at least to the external diameter 21 of the valve body 2.

The hollow space 50 is connected to a plurality of openings 40. The opening 11 is connected to the hollow space 50, if the valve body 2 doesn't close the opening 11. A fluid entering through the opening flows through the opening 11 into the hollow space 50 and is directed through the hollow space 50 to the openings 40, from where it enters the first passage portion 51 of the passage 5.

The cross-section of the hollow space 50 is greater than the cross-section of the opening 11, such that the fluid can expand rapidly into the hollow space. For this reason, the check valve according to the invention can surprisingly be switched much more rapidly from the closed state to the open state than conventional check valves. A check valve according to the invention has therefore a substantially smaller response time compared to conventional check valves, such that a substantially reduced switching period is achievable.

The cylindrical portion 38 is configured in particular as a jacket element of the pot-shaped opening 33. The pot-shaped opening 33 can be formed by a plurality of bar-shaped elements, which extend from the connection element 132 to the end of the pot-shaped opening 33 which is not shown in the drawings. The pot-shaped opening according to FIG. 12 comprises a bottom bounded by the cylindrical portion 38, which contains an opening 43. This opening 43 can in particular be arranged about the central axis 60 rotationally symmetrically.

According to an embodiment not shown in the drawings, the second jacket element 32 can comprise a polygonal, in particular rectangular cross-section.

It should be apparent to those skilled in the art that many more modifications besides those already described are possible without departing from the inventive concepts herein. The inventive subject matter, therefore, is not to be restricted by the previous description except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or the claims refer to at least one of an element or component selected from the group consisting of A, B, C . . . and N, the text should be interpreted as requiring only one element from the group, not A plus N, or B plus N, etc.

The invention claimed is:

1. A check valve for reception in a fluid passage, comprising
    a valve seat element;
    a valve body; and
    a sleeve,
    wherein the valve body is moveable in such a manner in the sleeve, that the valve body rests in a first position on the valve seat element and the valve body is arranged at a distance with respect to the valve seat element in a second position,
    wherein the valve seat element contains an opening which is closed by the valve body in the first position, wherein a spring element is arranged between the valve body and the sleeve, wherein the spring element comprises a first end and a second end, wherein the valve body is retained by the spring element in the first position as long as the fluid pressure present in the opening of the valve seat is smaller than the closing force of the spring element, wherein the first end of the spring element is connected to the valve body, wherein the sleeve comprises a first jacket element which is configured to be retained in the passage, a second jacket element which is configured to retain the second end of the spring element, and a connection element connecting the first and second jacket elements, and wherein the sleeve has an annular ring that contacts with the valve seat and wherein the annular ring is free of a flow-through path, wherein the spring element is retained in an opening of the second jacket element, wherein either the connection element or the second jacket element, or each, respectively, comprises a first cylindrical portion and a second cylindrical portion, whereby the first cylindrical portion comprises a central opening for the reception of the valve body, wherein the inner diameter of the second cylindrical portion is smaller than the inner diameter of the first cylindrical portion, wherein a conical adapter is arranged between the first cylindrical portion and the second cylindrical portion, wherein the inner surface of the conical adapter is used as a support surface for the valve position, if the valve body is in the second position.

2. The check valve according to claim 1, wherein the first jacket element comprises an external diameter, which substantially corresponds to the inner diameter of the passage.

3. The check valve according to claim 1, wherein the second jacket element comprises a maximum external diameter, which is smaller than the maximum external diameter of the first jacket element.

4. The check valve according to claim 1, wherein the external diameter of the opening of the second jacket element is the same as or smaller than the maximum external diameter of the first jacket element.

5. The check valve according to claim 1, wherein the valve body is configured as a spherical valve body.

6. The check valve according to claim 1, wherein the second jacket element contains a plurality of openings.

7. The check valve according to claim 1, wherein the connection element contains a plurality of openings.

8. The check valve according to claim 1, wherein the sleeve is a single, monolithic part.

9. The check valve according to claim 1, wherein the sleeve, in its entirety, is one injection-molded member.

10. The check valve according to claim 1, wherein a hollow space is arranged between the valve seat element and the sleeve.

11. The check valve according to claim 10, wherein the hollow space is connected to a plurality of flow exit openings in the sleeve.

12. The check valve according to claim 10, wherein the opening of the valve seat is connected to the hollow space, if the valve body doesn t close the opening of the valve seat.

13. The check valve according to claim 10, wherein the cross-sectional area of the hollow space is larger than the cross-sectional area of the opening of the valve seat.

14. The check valve according to claim 1, wherein the second jacket element contains a cup-shaped opening.

15. The check valve according to claim 14, wherein the cup-shaped opening contains an axially symmetrical opening.

16. The check valve according to claim 15, wherein the axially symmetrical opening comprises a diameter which is smaller than the inner diameter of the spring element.

17. The check valve according to claim 1, wherein the second cylindrical portion defines the opening of the second jacket element.

18. The check valve according to claim 17, wherein the first cylindrical portion comprises an inner diameter which corresponds at least to an external diameter of the valve body.

19. The check valve according to claim 18, wherein the sleeve comprises a sleeve opening which is arranged in the second jacket element.

20. The check valve according to claim 19, wherein the connection element, has a stepped portion that is flush with a corresponding stepped region of the valve seat.

* * * * *